US011295357B2

(12) United States Patent
Tashiro

(10) Patent No.: US 11,295,357 B2
(45) Date of Patent: Apr. 5, 2022

(54) PARKING MANAGEMENT SYSTEM AND PARKING MANAGEMENT METHOD

(71) Applicant: MITSUBISHI HEAVY INDUSTRIES MACHINERY SYSTEMS, LTD., Kobe (JP)

(72) Inventor: Taro Tashiro, Tokyo (JP)

(73) Assignee: MITSUBISHI HEAVY INDUSTRIES MACHINERY SYSTEM, LTD., Kobe (JP)

(*) Notice: Subject to any disclaimer, the term of this patent is extended or adjusted under 35 U.S.C. 154(b) by 803 days.

(21) Appl. No.: 16/082,453

(22) PCT Filed: Feb. 17, 2017

(86) PCT No.: PCT/JP2017/005886
§ 371 (c)(1),
(2) Date: Sep. 5, 2018

(87) PCT Pub. No.: WO2017/169266
PCT Pub. Date: Oct. 5, 2017

(65) Prior Publication Data
US 2019/0087877 A1 Mar. 21, 2019

(30) Foreign Application Priority Data
Mar. 31, 2016 (JP) .............................. JP2016-073498

(51) Int. Cl.
G06Q 30/02 (2012.01)
G08G 1/14 (2006.01)
(Continued)

(52) U.S. Cl.
CPC ......... *G06Q 30/0284* (2013.01); *G07B 15/02* (2013.01); *G08G 1/04* (2013.01);
(Continued)

(58) Field of Classification Search
CPC . G07B 15/02; G06Q 2240/00; G06Q 30/0284
See application file for complete search history.

(56) References Cited

U.S. PATENT DOCUMENTS 6,340,935 B1 1/2002 Hall
2013/0265423 A1 10/2013 Bernal et al.

FOREIGN PATENT DOCUMENTS

GB 2441382 A 3/2008
JP 2013-073339 A 4/2013
(Continued)

OTHER PUBLICATIONS

Zhang Z, Li X, Yuan H, Yu F. A Street Parking System Using Wireless Sensor Networks. International Journal of Distributed Sensor Networks. Jun. 2013. doi:10.1155/2013/107975 (Year: 2013).*
(Continued)

*Primary Examiner* — Emmett K. Walsh
(74) *Attorney, Agent, or Firm* — Manabu Kanesaka; Benjamin Hauptman; Kenneth Berner

(57) ABSTRACT

A parking management system includes a reading device, a vehicle detection device, and a parking management device. The reading device reads identification information for identifying a vehicle from an identifying body mounted on the vehicle that enters a boundary of a management area including parking spaces in each of which one vehicle can be parked. The vehicle detection device detects the vehicle that exists in each of the parking spaces. When the identical identification information is not read again during a passing determination time from a time point at which the identification information is initially read by the reading device, and when a new vehicle is detected in the parking space by the vehicle detection device during the passing determination
(Continued)

time, the parking management device determines that the vehicle indicated by the identification information is parked in the parking space.

6 Claims, 11 Drawing Sheets

(51) Int. Cl.
    *G07B 15/02*     (2011.01)
    *G08G 1/04*     (2006.01)

(52) U.S. Cl.
    CPC ............ *G08G 1/142* (2013.01); *G08G 1/146* (2013.01); *G06Q 2240/00* (2013.01)

(56) References Cited

FOREIGN PATENT DOCUMENTS

| | | |
|---|---|---|
| JP | 2013-218679 A | 10/2013 |
| WO | 00/46068 A1 | 8/2000 |
| WO | 2014/072971 A1 | 5/2014 |
| WO | WO-2014072971 A * | 5/2014 ............ G08G 1/017 |

OTHER PUBLICATIONS

PCT/ISA/210, "International Search Report for International Application No. PCT/JP2017/005886," dated Apr. 25, 2017.
PCT/ISA/237, "Written Opinion of the International Searching Authority for International Application No. PCT/JP2017/005886," dated Apr. 25, 2017.

\* cited by examiner

PARKING MANAGEMENT SYSTEM AND PARKING MANAGEMENT METHOD

TECHNICAL FIELD

The present invention relates to a parking management system and a parking management method.

This application claims priority based on JP 2016-073498 filed in Japan on Mar. 31, 2016, of which the content is incorporated herein by reference.

BACKGROUND ART

Patent Document 1 discloses a technology that detects an entry into and an exit from a parking lot in Dedicated Short Range Communications (DSRC) and calculates a charge amount on the basis of a time from an entry time point to an exit time point.

CITATION LIST

Patent Document

Patent Document 1: JP 2013-73339 A

SUMMARY OF INVENTION

Problem to be Solved by the Invention

As a parking management method, various methods including one disclosed in the Patent Document 1 are conceivable, and preferably the parking management method can be achieved with simple structure.

It is an object of the present invention to provide a parking management system and a parking management method that enable parking management with simple structure.

Solution to Problem

According to a first aspect of the present invention, a parking management system (1) includes a reading device (101, 104, 501) configured to be provided on a boundary of a management area (MA, PA) including parking spaces (PS) in each of which one vehicle (C) and configured to read identification information for identifying a vehicle from an identifying body (CE, CT) mounted on the vehicle that passes the boundary of the management area can be parked, a vehicle detection device (106) configured to detect the vehicle positioned on each of the parking spaces, and a parking management device (107) configured to acquire the identification information from the reading device and acquire a detection result of the vehicle from the vehicle detection device. The parking management device includes a parking determination unit (203) configured to determine that the vehicle indicated by the identification information is parked in the parking space when the identical identification information is not read again during a predetermined passing determination time of which measurement is started from a time point at which the identification information is initially read by the reading device, and when a new vehicle is detected in the parking space by the vehicle detection device.

When the identical identification information is read again during the passing determination time from a time point at which the identification information is initially read by the reading device, it is determined that, after entering the management area, the vehicle indicated by the identification information exits from the management area without being parked in the management area. In contrast, the vehicle is detected in the parking space during the passing determination time, it is determined that the vehicle is parked in the parking space. Thus, the parking management can be achieved with simple structure.

According to a second aspect of the present invention, in the parking management system according to the first aspect, the parking management device further includes a charge amount specifying unit (205) configured to specify a parking fee of the vehicle determined to be parked in the parking space by the parking determination unit on a basis of a time from a time point at which the identification information is initially read by the reading device to a time point at which the identification information is read again.

Consequently, the parking management system according to the second aspect can charge the vehicle determined to be parked in the parking space for a parking fee in accordance with a time from an entry time point to an exit time point.

According to a third aspect of the present invention, the parking management system according to the first or second aspect further includes a secondary reading device (801) configured to be provided on the boundary of the parking area and configured to read the identification information from the identifying body mounted on the vehicle that enters the boundary of the parking area, and the management area is constituted by a plurality of parking areas (PA1, PA2) including the parking spaces in each of which one vehicle can be parked, and the parking management device further includes a parking area specifying unit (901) configured to specify the parking area including the parking space in which the vehicle is parked, on a basis of a reading result of the identification information of the vehicle determined to be parked by the parking determination unit.

Consequently, the parking management system according to the third aspect can specify a parking area in which the vehicle is parked, out of the management area.

According to a fourth aspect of the present invention, in the parking management system according to any one of the first to third aspects, the parking management device further includes a number-of-remaining-vehicle specifying unit (208) configured to specify the number of pieces of identification information that is not read again during the passing determination time from a time point the identification information is initially read by the reading device, a number-of-parked-vehicle specifying unit (207) configured to specify the number of parking spaces where the vehicle is detected by the vehicle detection device, and an abnormality determination unit (209) configured to determine that an abnormality occurs when the number of pieces of identification information specified by the number-of-remaining-vehicle specifying unit has not continuously correspond to the number of parking spaces specified by the number-of-parked-vehicle specifying unit during a predetermined abnormality determination time or more.

Consequently, the parking management system according to the fourth aspect can determine that an abnormality occurs when the vehicle whose vehicle identification information cannot be read by the reading device is parked in the parking space, and when the vehicle is parked at a place except for the parking space.

According to a fifth aspect of the present invention, in the parking management system according to any one of the first to fourth aspects, the management area includes a plurality of boundaries, and each of the reading devices are provided on each of the boundaries of the management area, and when the identical identification information is not read by another reading device during the passing determination time from a time point at which the identical identification information is initially read by one reading device, and when a vehicle is detected in the parking space by the vehicle detection device during the passing determination time, the parking determination unit determines that the vehicle indicated by the identification information is parked in the parking space.

Consequently, the parking management system according to the fifth aspect can appropriately determine the presence or absence of the parking in the parking space in a management area which a vehicle makes an entry from one boundary and exits from another boundary.

According to a sixth aspect of the present invention, in the parking management system according to any one of the first to fifth aspects, the management area is one division of a roadway (L1), and the parking space is part of the division, and the reading device is provided on the boundary on an upstream side of the division and on the boundary on a downstream side of the division.

Consequently, the parking management system according to the sixth aspect can use part of the roadway as an on-street parking place.

According to a seventh aspect of the present invention, a parking management method includes reading identification information for identifying a vehicle from an identifying body mounted on the vehicle that enters a boundary of a management area including parking spaces in each of which one vehicle can be parked, detecting the vehicle that exists in each of the parking spaces, and determining that the vehicle indicated by the identification information is parked in the parking space when the identical identification information is not read again during a predetermined passing determination time from a time point at which the identification information is initially read, and when a vehicle is detected in the parking space during the passing determination time.

Advantageous Effect of Invention

According to at least one of the aspects described above, the parking management can be achieved with simple structure.

DESCRIPTION OF EMBODIMENTS

First Embodiment

Hereinafter, a parking management system according to a first embodiment will be described in detail with reference to drawings.

Entire Configuration

Figure 1:
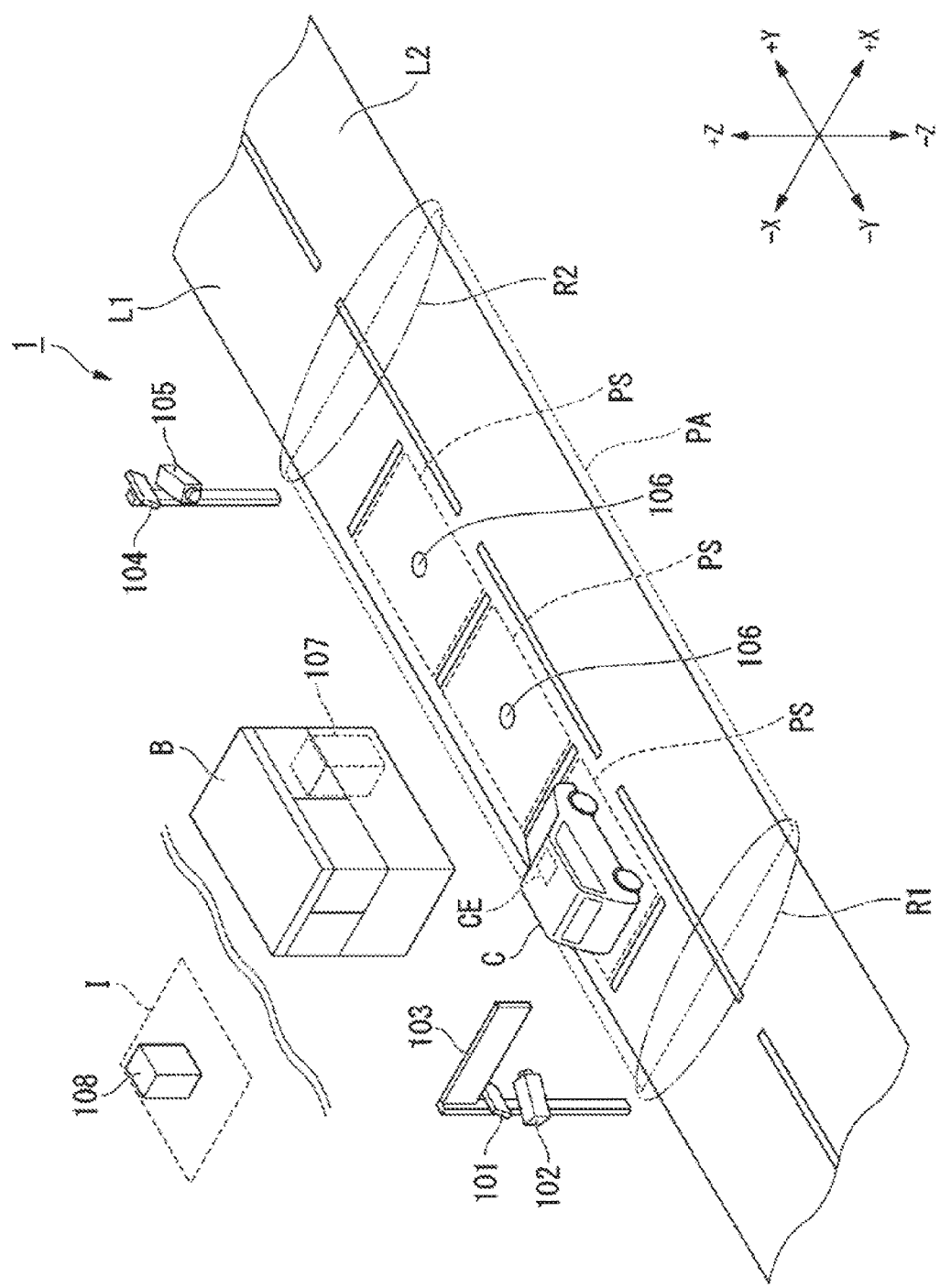
FIG. 1 is a view illustrating the entire configuration of a parking management system according to a first embodiment.

FIG. 1 is a view illustrating the entire configuration of the parking management system according to the first embodiment. In a parking area PA set in one division of a first lane L1 of a two-way, two-lane roadway composed of the first lane L1 and a second lane L2, a parking management system 1 according to the first embodiment is a system for charging a vehicle C parked on a parking space PS in the parking area PA for a parking fee. In the present embodiment, the management area of the parking management system 1 is constituted by one parking area PA, and the management area corresponds to the parking area PA. The parking management system 1 according to the first embodiment permits the parking of the vehicle C in which an onboard unit CE storing a vehicle ID is mounted.

Each parking space PS is divided by a division line. The division line is emphasized when the first lane L functions as an on-street parking place. The emphasis of the division line, for example, is achieved by irradiation of light having directivity with respect to the division line or by luminescence of a division line formed with luminous bodies such as an electroluminescence (EL) luminous body. The first lane L1 functions as a traffic roadway when the first lane L1 does not function as the on-street parking place.

As illustrated in FIG. 1, the parking management system 1 includes a first antenna 101, a first camera 102, a roadside display device 103, a second antenna 104, a second camera 105, a vehicle detection device 106, a parking management device 107, and a center settlement processing device 108.

The first antenna 101, the first camera 102, and the roadside display device 103 are installed on a pole provided in the vicinity of a boundary (entry-side boundary) on the upstream side (a near side in the travel direction; −Y direction side in FIG. 1) of the parking area PA. The second antenna 104 and the second camera 105 are installed on a pole provided in the vicinity of a boundary (exit-side boundary) on the downstream side (a far side in the travel direction; +Y direction side in FIG. 1) of the parking area PA. The vehicle detection device 106 is installed in the center of each of the parking spaces PS divided in the parking area PA. The parking management device 107 is installed in a manned booth B provided on the roadside of the parking area PA. Note that, in other embodiments, when the manned booth B is not provided on the roadside of the parking area PA, the parking management device 107 may be installed in a roadside area, a roadside structure, or a remote place I. The center settlement processing device 108 is installed at the remote place I.

The first antenna 101 performs wireless communications with the onboard unit CE mounted on the vehicle C passing through the boundary on the upstream side of the parking area PA. That is, the first antenna 101 is installed in such a manner that the boundary on the upstream side of the parking area PA is included in a communication range R1. The first antenna 101 reads a vehicle ID that identifies the vehicle C from the onboard unit CE. The first antenna 101 is one example of a reading device for reading identification information that identifies the vehicle C from an identifying body (onboard unit CE) mounted on the vehicle C that enters the boundary of the management area. Note that, as the vehicle ID, one vehicle may have multiple types of identification (e.g., an onboard unit management number and a vehicle number) but in the present embodiment, one type of identification (e.g., the onboard unit management number) is focused from among them.

The first camera 102 takes a photograph of the parking spaces PS and the traffic roadway in the parking area PA from the upstream side of the parking area PA.

The roadside display device 103 displays information indicating management status as the on-street parking place of the first lane L1. As an example of the information indicating the management status, whether the first lane L1 functions as the on-street parking place and the number of empty parking spaces PS are included. The roadside display device 103, for example, can be achieved by Variable Message Sign (VMS) or the like.

The second antenna 104 performs wireless communications with the onboard unit CE mounted on the vehicle C passing through the boundary on the downstream side of the parking area PA. That is, the second antenna 104 is installed in such a manner that the boundary on the downstream side of the parking area PA is included in a communication range R2. The second antenna 104 reads a vehicle ID that identifies the vehicle C from the onboard unit CE. The second antenna 104 is one example of a reading device for reading identification information that identifies the vehicle C from the identifying body (onboard unit CE) mounted on the vehicle C that enters the boundary of the management area.

The second camera 105 takes a photograph of the parking spaces PS and the traffic roadway in the parking area PA from the downstream side of the parking area PA.

The vehicle detection device 106 detects the vehicle C that exists in the parking space PS in which the vehicle detection device 106 itself is provided. The vehicle detection device 106 is achieved, for example, by an ultrasonic wave sensor, a magnetic coil (loop coil) and the like.

The parking management device 107 obtains information from the first antenna 101, the second antenna 104, and the vehicle detection device 106 and performs charging processing for the vehicle C parked in the parking space PS. In addition, the parking management device 107 determines whether an inappropriate vehicle C is parked in the parking space PS. The determination result is displayed on a display of the parking management device 107, thereby notifying a person in charge who is on standby in the manned booth B of the determination result. In addition, the parking management device 107 displays images photographed by the first camera 102 and the second camera 105 on the display. The person in charge monitors the dumping of an object onto the parking spaces PS, the entry of two-wheel vehicles, and the stoppage of the vehicle C on the second lane L2, by monitoring the images of the first camera 102 and the second camera 105.

The center settlement processing device 108 performs electronic settlement processing in accordance with a parking fee received from the parking management device 107 via a credit card company and the like.

Functional Configuration

Figure 2:
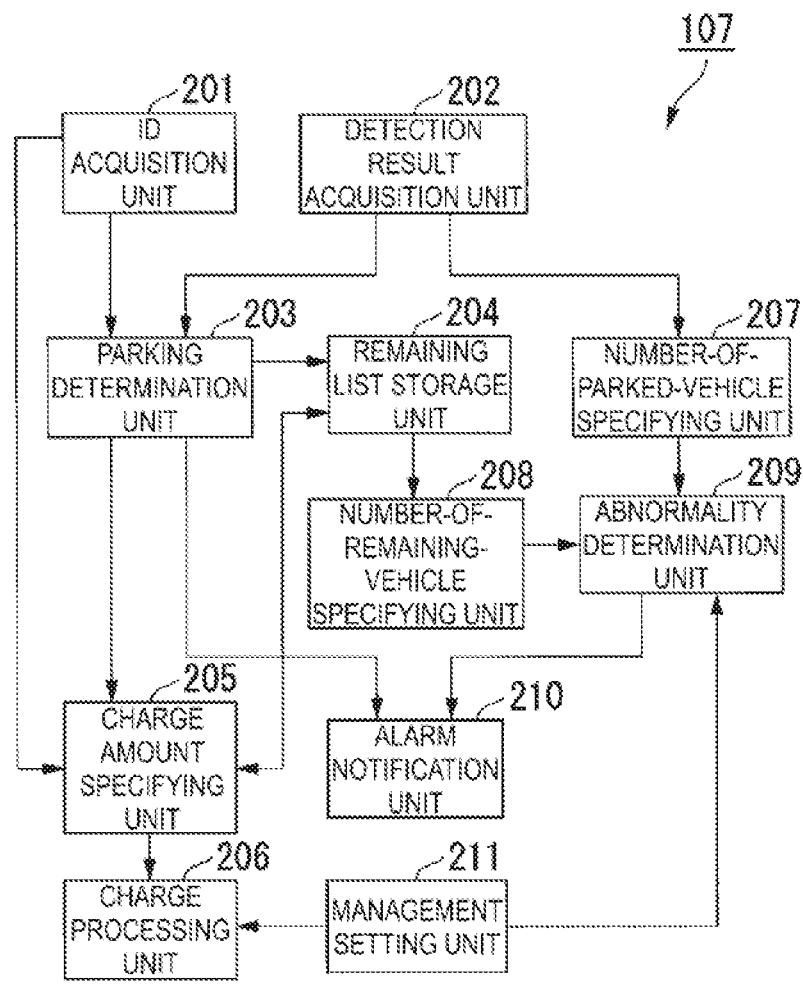
FIG. 2 is a schematic block diagram illustrating the functional configuration of a parking management device according to the first embodiment.

FIG. 2 is a schematic block diagram illustrating the functional configuration of the parking management device according to the first embodiment. The parking management device 107 includes an ID acquisition unit 201, a detection result acquisition unit 202, a parking determination unit 203, a remaining list storage unit 204, a charge amount specifying unit 205, a charge processing unit 206, a number-of-parked-vehicle specifying unit 207, a number-of-remaining-vehicle specifying unit 208, an abnormality determination unit 209, an alarm notification unit 210, and a management setting unit 211.

The ID acquisition unit 201 acquires a vehicle ID read by communication with the onboard unit CE from the first antenna 101 and the second antenna 104.

The detection result acquisition unit 202 acquires the detection result of the vehicle C from each vehicle detection device 106. The parking determination unit 203 determines whether the vehicle C is parked in the parking space PS on the basis of the vehicle ID acquired by the ID acquisition unit 201 and the detection result of the vehicle detection device 106 acquired by the detection result acquisition unit 202.

The remaining list storage unit 204 stores the vehicle ID of the vehicle C that remains in the parking area PA. Herein, "remaining in the parking area PA" means a state in which the vehicle C remains in the parking area PA without passing the parking area PA. Parking is one form of remaining.

The charge amount specifying unit 205 calculates a parking fee for the vehicle C determined to be parked in the parking space PS by the parking determination unit 203. For example, the charge amount specifying unit 205 calculates a parking fee by multiplying a specified time by a unit parking fee per time. The unit parking fee may be varied in accordance with the empty status of the parking space PS or a time slot.

The charge processing unit 206 conducts communications with the center settlement processing device 108 and performs the charging processing of a parking fee specified by the charge amount specifying unit 205.

The number-of-parked-vehicle specifying unit 207 calculates the number of vehicles C parked in the parking spaces PS on the basis of the detection result of each vehicle detection device 106.

The number-of-remaining-vehicle specifying unit 208 calculates the number of vehicle IDs (that is, the number of vehicles according to the vehicle IDs) stored in the remaining list storage unit 204.

When the number of vehicles C specified by the number-of-parked-vehicle specifying unit 207 does not correspond to the number of vehicle IDs specified by the number-of-remaining-vehicle specifying unit 208 during a preset abnormality determination time, the abnormality determination unit 209 determines that an abnormality occurs. Note that, as for "the number of vehicle IDs", even when a plurality of vehicle IDs having different types is detected, one type of vehicle ID out of the plurality of vehicle IDs is focused and handled, and the one type of vehicle ID is counted as one if the one type of vehicle ID is related to an identical vehicle. Note that, as the vehicle IDs, in the case that the plurality of vehicle IDs having different types is provided, all the types of vehicle IDs may be focused and handled, and in this case, the plural types of vehicle IDs may be counted as one en masse if the plural types of vehicle IDs are related to an identical vehicle.

The alarm notification unit 210 notifies the person in charge of the occurrence of abnormality by displaying an alarm on the display.

The management setting unit 211 receives the input of a setting as to whether the first lane L1 functions as the on-street parking place. When the setting for causing the first lane L1 to function as the on-street parking place is input, the management setting unit 211 emphasizes the division line and causes the roadside display device 103 to display that the first lane L1 functions as the on-street parking place. In contrast, when the setting for causing the first lane L1 not to function as the on-street parking place is input, the management setting unit 211 releases the emphasis of the division line and causes the roadside display device 103 to display that the first lane L1 does not function as the on-street parking place. In addition, when the setting for causing the first lane L1 not to function as the on-street parking place is input, the management setting unit 211 permits the start of execution of a parking determination operation and an abnormality determination operation described below. In contrast, when the setting for causing the first lane L1 not to function as the on-street parking place is input, the management setting unit 211 prohibits the start of execution of the parking determination operation and the abnormality determination operation described below.

Parking Determination Operation by Parking Management Device

Herein, the parking determination operation by the parking management device 107 will be described. The parking determination operation is an operation in which the parking management device 107 determines whether the vehicle C is parked in the parking space PS and performs the charging processing for the vehicle C parked in the parking space PS.

Figure 3:
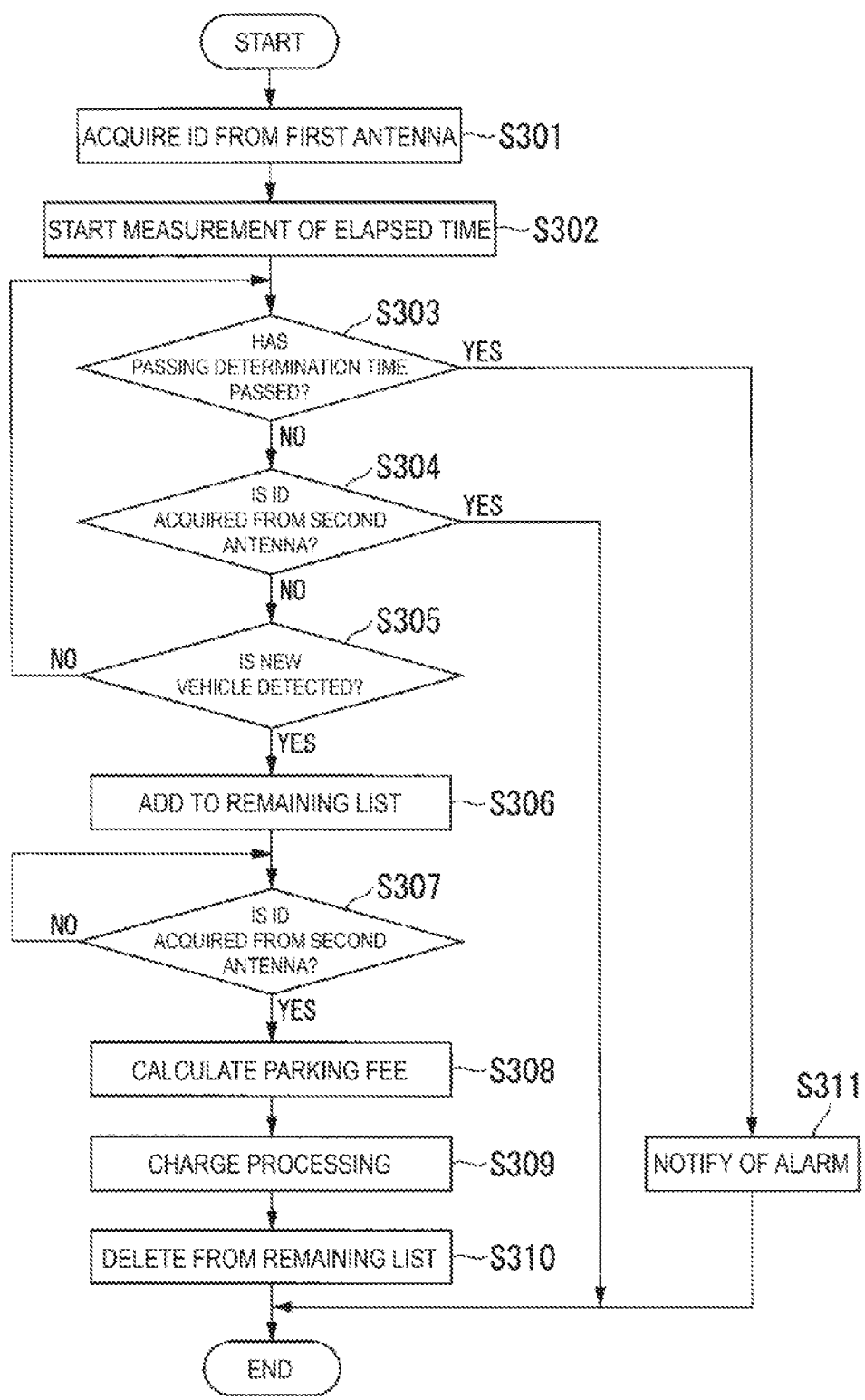
FIG. 3 is a flowchart illustrating a parking determination operation according to the first embodiment.

FIG. 3 is a flowchart illustrating the parking determination operation according to the first embodiment.

The parking management device 107 starts the parking determination operation illustrated in FIG. 3 when the ID acquisition unit 201 acquires the vehicle ID from the first antenna 101. The parking determination operation is simultaneously executed for each of vehicle IDs read by the first antenna 101. That is, in the case where the parking management device 107 have already been executing the parking determination operation for a first vehicle ID, when the first antenna 101 reads a second vehicle ID, the parking management device 107 simultaneously executes the parking determination operation for the first vehicle ID and the parking determination operation for the second vehicle ID.

The ID acquisition unit 201 of the parking management device 107 acquires the vehicle ID from the first antenna 101 (Step S301). Subsequently, the parking determination unit 203 starts the measurement of an elapsed time from a time point when the ID acquisition unit 201 has acquired the vehicle ID (Step S302). Subsequently, the parking determination unit 203 determines whether the measured elapsed time exceeds a preset passing determination time (e.g., five minutes) (Step S303).

When the elapsed time from a time point when the ID acquisition unit 201 has acquired the vehicle ID does not exceed the passing determination time (Step S303, No), the parking determination unit 203 determines whether the ID acquisition unit 201 acquires an identical vehicle ID from the second antenna 104 (Step S304). That is, the parking determination unit 203 determines whether the identical vehicle ID is read again by the second antenna 104 during the passing determination time from a time point when the first antenna 101 has read the vehicle ID. When the ID acquisition unit 201 has acquired the identical vehicle ID from the second antenna 104 during the passing determination time (Step S304, YES), the parking management device 107 finishes the parking determination operation without performing the charging processing. This is because the vehicle C has passed the parking area PA without being parked in the parking area PA.

In contrast, when the ID acquisition unit 201 does not acquire the identical vehicle ID from the second antenna 104 (Step S304, NO), the parking determination unit 203 determines whether a new vehicle C is detected in the parking space PS on the basis of the detection result acquired by the detection result acquisition unit 202 (Step S305). Specifically, when the previous detection results indicate the absence of a vehicle, and the present detection results indicate the presence of a vehicle in any of the plurality of vehicle detection devices 106, the parking determination unit 203 determines that a new vehicle C is detected in the parking space PS. When a new vehicle C is not detected in the parking space PS (Step S305, NO), the parking management device 107 returns to the processing in Step S303 and determines whether the passing determination time has passed again.

In contrast, when a new vehicle C is detected in the parking space PS (Step S305, YES), the parking determination unit 203 determines that the vehicle C indicated by the vehicle ID acquired at Step S301 is parked in the parking space PS. The parking determination unit 203 associates the vehicle ID with the time point at which the vehicle ID is read by the first antenna 101 and adds the vehicle ID and the time point to the remaining list storage unit 204 (Step S306).

Subsequently, the charge amount specifying unit 205 determines whether the ID acquisition unit 201 acquires a vehicle ID identical to that of Step S301 from the second antenna 104 (Step S307). When the ID acquisition unit 201 does not acquire the identical vehicle ID from the second antenna 104 (Step S307, NO), the charge amount specifying unit 205 repeats the determination of Step S307 until the identical vehicle ID is acquired. In contrast, when the ID acquisition unit 201 acquires the identical vehicle ID from the second antenna 104 (Step S307, YES), the charge amount specifying unit 205 specifies a time ranging from a read time point at which the vehicle ID is read by the first antenna 101, the read time being stored in the remaining list storage unit 204 in association with the vehicle ID, to a read time point at which the vehicle ID is read by the second antenna 104. The charge amount specifying unit 205 calculates a parking fee on the basis of the specified time (Step S308). Subsequently, the charge processing unit 206 conducts communications with the center settlement processing device 108 and performs the charging processing on the basis of a parking fee calculated by the charge amount specifying unit 205 (Step S309). Then, the charge amount specifying unit 205 deletes the vehicle ID acquired at Step S301 from the remaining list storage unit 204 (Step S310) and finishes the parking determination operation.

In contrast, at Step S303, when the elapsed time from a time point when the ID acquisition unit 201 has acquired the vehicle ID exceeds the passing determination time (Step S303, YES), the alarm notification unit 210 notifies the person in charge of an alarm (Step S311). That is, the alarm notification unit 210 notifies an alarm in the case where the vehicle ID identical to that of Step S301 is not read by the second antenna 104, and a new vehicle C is not detected in the parking space PS within the passing determination time. This is because the vehicle C remains in the parking area PA without being parked in the parking space PS. The example of a state in which the vehicle C remains in the parking area PA without being parked in the parking space PS includes a state in which the vehicle C is parked at a place except for the parking space PS, a state in which the vehicle C keeps travelling in the parking area PA due to a lack of the parking space PS for use, and the like. In the case that the vehicle C is parked at a place except for the parking space PS, there is a possibility that the passage of other vehicles C is impeded by the aforementioned vehicle C. In contrast, in the case that the vehicle C keeps travelling in the parking area PA, it is necessary for the person in charge to receive an explanation of the situation from a driver of the vehicle C.

When the alarm is notified, the person in charge verifies the images of the first camera 102 and the second camera 105 displayed on the display of the parking management device 107, proceeds to the parking area PA, and makes contact with the driver of the corresponding vehicle C.

Abnormality Determination Operation by Parking Management Device

Herein, the abnormality determination operation by the parking management device 107 will be described. The abnormality determination operation is an operation in which the parking management device 107 detects an abnormal state such as a state in which an inappropriate vehicle C is parked in the parking space PS and a state in which a vehicle C is parked at a place except for the parking space PS, and notifies an alarm.

Figure 4:
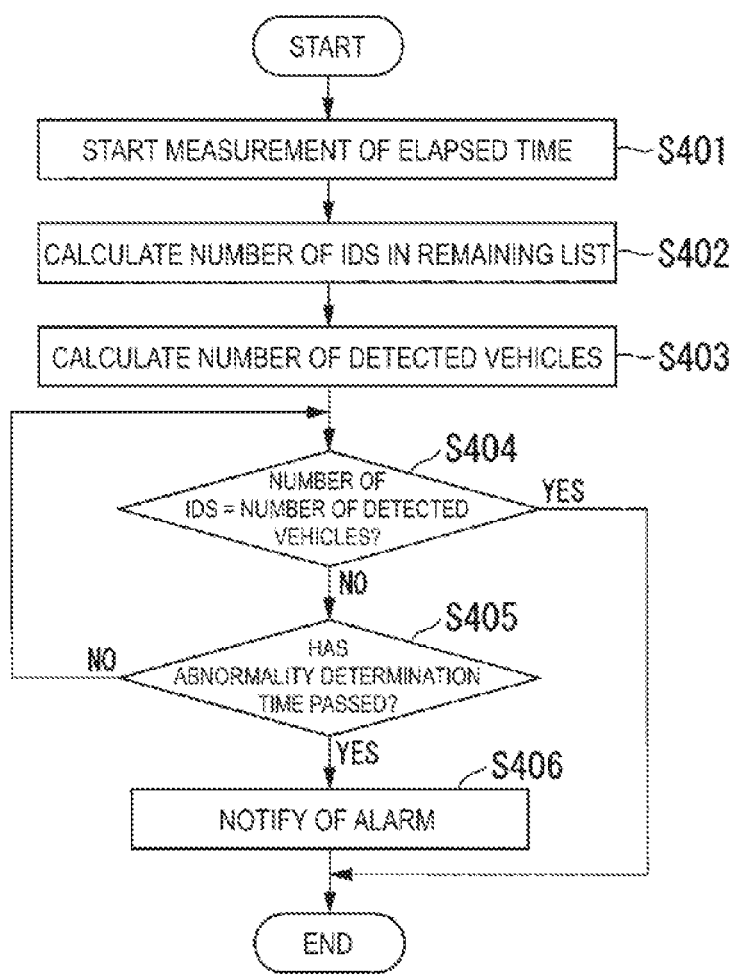
FIG. 4 is a flowchart illustrating an abnormality determination operation according to the first embodiment.

FIG. 4 is a flowchart illustrating the abnormality determination operation according to the first embodiment.

The parking management device 107 starts the abnormality determination operation illustrated in FIG. 4 in accordance with a preset execution cycle of the abnormality determination operation. When the parking management device 107 starts the abnormality determination operation, the abnormality determination unit 209 starts the measurement of an elapsed time from a time point when the abnormality determination operation is stared (Step S401). The number-of-remaining-vehicle specifying unit 208 calculates the number of vehicle IDs stored in the remaining list storage unit 204 (Step S402). In addition, the number-of-parked-vehicle specifying unit 207 calculates the number of vehicles C parked in the parking spaces PS on the basis of the detection result of each vehicle detection device 106 (Step S403). Specifically, the number-of-parked-vehicle specifying unit 207 calculates the number of vehicles whose presences are indicated by the detection results of the plurality of vehicle detection devices 106 as the number of parked vehicles C.

Subsequently, the abnormality determination unit 209 determines whether the number of vehicle IDs calculated by the number-of-remaining-vehicle specifying unit 208 corresponds to the number of vehicles C calculated by the number-of-parked-vehicle specifying unit 207 (Step S404). When the number of vehicle IDs does not correspond to the number of vehicles C (Step S404, NO), the abnormality determination unit 209 determines whether an elapsed time from the start time point of the abnormality determination operation exceeds a preset abnormality determination time (e.g., five minutes) (Step S405). In the case where the elapsed time from the start time point of the abnormality determination operation does not exceed the abnormality determination time (Step S405, NO), the parking management device 107 returns to the processing at Step S404 and compares the number of vehicle IDs with the number of vehicles C again. In contrast, in the case where the elapsed time from the start time point of the abnormality determination operation exceeds the abnormality determination time while the number of vehicle IDs does not correspond to the number of vehicles C (Step S405, YES), the abnormality determination unit 209 determines that an abnormality occurs. Then, the alarm notification unit 210 notifies the person in charge of an alarm (Step S406).

A state in which the number of vehicle IDs stored in the remaining list storage unit 204 does not correspond to the number of vehicles C in the parking spaces PS is either a state in which the number of vehicle IDs is greater than the number of vehicles C or a state in which the number of vehicle IDs is less than the number of vehicles C.

The state in which the number of vehicle IDs is greater than the number of vehicles C is a state in which there are the vehicles C remaining in the parking area PA without being parked in the parking spaces PS. In this case, as described above, there is a possibility that the passage of other vehicles C is impeded by the aforementioned vehicle C.

In contrast, the state in which the number of vehicle IDs is less than the number of vehicles C is a state in which the vehicle C not including the onboard unit CE is parked in the parking space PS. In this case, the settlement processing cannot be performed by the center settlement processing device 108, and a charge amount based on the read time point of the vehicle ID cannot be calculated, so that there is a possibility that a parking fee cannot be collected from the vehicle C. Note that the parking management system 1 according to the present embodiment permits parking only the vehicle C including the onboard unit CE in the parking space PS. That is, the vehicle C parked in the parking space PS without including the onboard unit CE is an illegitimate parking vehicle.

When the alarm is notified, the person in charge verifies the images of the first camera 102 and the second camera 105 displayed on the display of the parking management device 107, proceeds to the parking area PA, and makes contact with the driver of the corresponding vehicle C.

Operational Effects

Thus, according to the present embodiment, when the identical vehicle ID (ID according to the identical vehicle) is not read again during the passing determination time from a time point at which the identical vehicle ID is initially read, and a new vehicle C is detected in the parking space PS during the passing determination time, the parking management system 1 determines that the vehicle C indicated by the vehicle ID is parked in the parking space PS. Consequently, the parking management system 1 can determine whether the vehicle C that enters the parking area PA is parked in an appropriate parking space PS.

Incidentally, parking spaces are defined in advance in a typical parking lot. In this parking lot, the vehicle C is required to be parked to stay in a parking space. This is because there is a possibility that the passage of other vehicles is impeded by the vehicle C parked at a place except for a defined parking space. As is the case with the technology disclosed in Patent Document 1 above, when only the entry into and exit from the parking lot are monitored, whether a vehicle is parked in a defined parking space cannot be recognized. In contrast, the parking management system 1 according to the present embodiment can determine whether the vehicle C is parked in an appropriate parking space PS.

In addition, according to the present embodiment, the parking management system 1 specifies a parking fee for the vehicle C that is determined to be parked in the parking space PS on the basis of a time ranging from a time point at which the vehicle ID is initially read to a time point at which the identical vehicle ID is read again (the next time once again). Consequently, the parking management system 1 can charge the vehicle C determined to be parked in the parking space PS for a parking fee in accordance with a time from an entry time point to an exit time point of the parking area PA.

Further, according to the present embodiment, the parking management system 1 determines that an abnormality occurs when the number of vehicle IDs that are not read again during the passing determination time from a time point at which the vehicle ID is initially read is different from the number of parking spaces PS in which the vehicle C is detected in the abnormality determination time or more. Consequently, the parking management system 1 can determine that an abnormality occurs when the vehicle C whose vehicle ID cannot be read is parked in the parking space PS, and when the vehicle C is parked at a place except for the parking space PS.

Further, according to the present embodiment, the parking area PA is one division of a roadway, and the parking space PS is part of the division, and the first antenna 101 is provided on the boundary on the upstream side of the division, and the second antenna 104 is provided on the boundary on the downstream side of the division. Consequently, the parking management system 1 can use part of the roadway as an on-street parking place.

Modified Example

Note that the parking management system 1 according to the present embodiment charges the vehicle C for a parking fee in accordance with a time from an entry time point to an exit time point of the parking area PA, but is not limited to this. For example, the parking management system 1 according to the other embodiments may charge a uniform parking fee irrespective of a parking time.

In addition, the parking management system 1 according to the present embodiment determines the presence or absence of an abnormality on the basis of the number of vehicle IDs stored in the remaining list storage unit 204 and the number of vehicles C detected by the vehicle detection device 106, but is not limited to this. For example, in other embodiments, the occurrence of an abnormality may be specified by monitoring the images of the first camera 102 and the second camera 105 by a person in charge all the times.

Further, the parking management system 1 according to the present embodiment permits parking the vehicle C in which an onboard unit CE is mounted, but is not limited to this. For example, the parking management system 1 according to the other embodiments may permit parking only the vehicle C indicated by a vehicle ID registered in the parking management device 107 in advance. When a vehicle ID read by the first antenna 101 does not correspond to a vehicle ID registered in advance, the parking management device 107 proceeds to the processing at Step S311 and notifies the person in charge of an alarm. A user can make application for use of the parking area PA with the onboard unit CE.

Further, the parking management system 1 according to the present embodiment monitors the roadway with the first camera 102 and the second camera 105, but is not limited to this. For example, the parking management system 1 according to the other embodiments may include a Pan Tilt Zoom (PTZ) camera in addition to the first camera 102 and the second camera 105. The angle of view of the PTZ camera is preset to each parking frame in advance, and when the parking determination unit 203 determines that vehicle C is parked in the parking space PS, and when the abnormality determination unit 209 determines that an abnormality occurs, the PTZ camera puts the vehicle C into focus and collates a number plate, a type of the vehicle, and a color of the vehicle. In addition, the parking management system 1 according to the other embodiments is not required to include at least one of the first camera 102 and the second camera 105. In addition, the parking management device 107 may detect the vehicle C that has remained for a certain amount of time or more at a place except for the parking space PS with image processing of the first camera 102, the second camera 105, or the PTZ camera. The parking management device 107 notifies the person in charge of the remaining of the vehicle C. Thus, the parking management device 107 can detect the remaining of the vehicle C that does not include the onboard unit CE.

In addition, in the parking management system 1 according to the present embodiment, the person in charge is stationed all the times in the manned booth B, but not limited to this. In the other embodiments, when the person in charge is not stationed all the times in the manned booth B, the alarm of the alarm notification unit 210 is notified to a communication terminal that the person in charge carries. In addition, in the case where the person in charge makes the rounds of a plurality of management areas, when an abnormality occurs, the alarm may be notified in the order of proximity of the present position of the person in charge or in the order of the degree of seriousness.

Second Embodiment

Hereinafter, a parking management system according to a second embodiment will be described in detail with reference to drawings. The parking management system 1 according to the first embodiment is a system for managing the parking area PA provided on the roadway of one-way travel direction. In contrast, the parking management system 1 according to the second embodiment is a system for managing the parking area PA in which only one gateway is provided.

Entire Configuration

Figure 5:
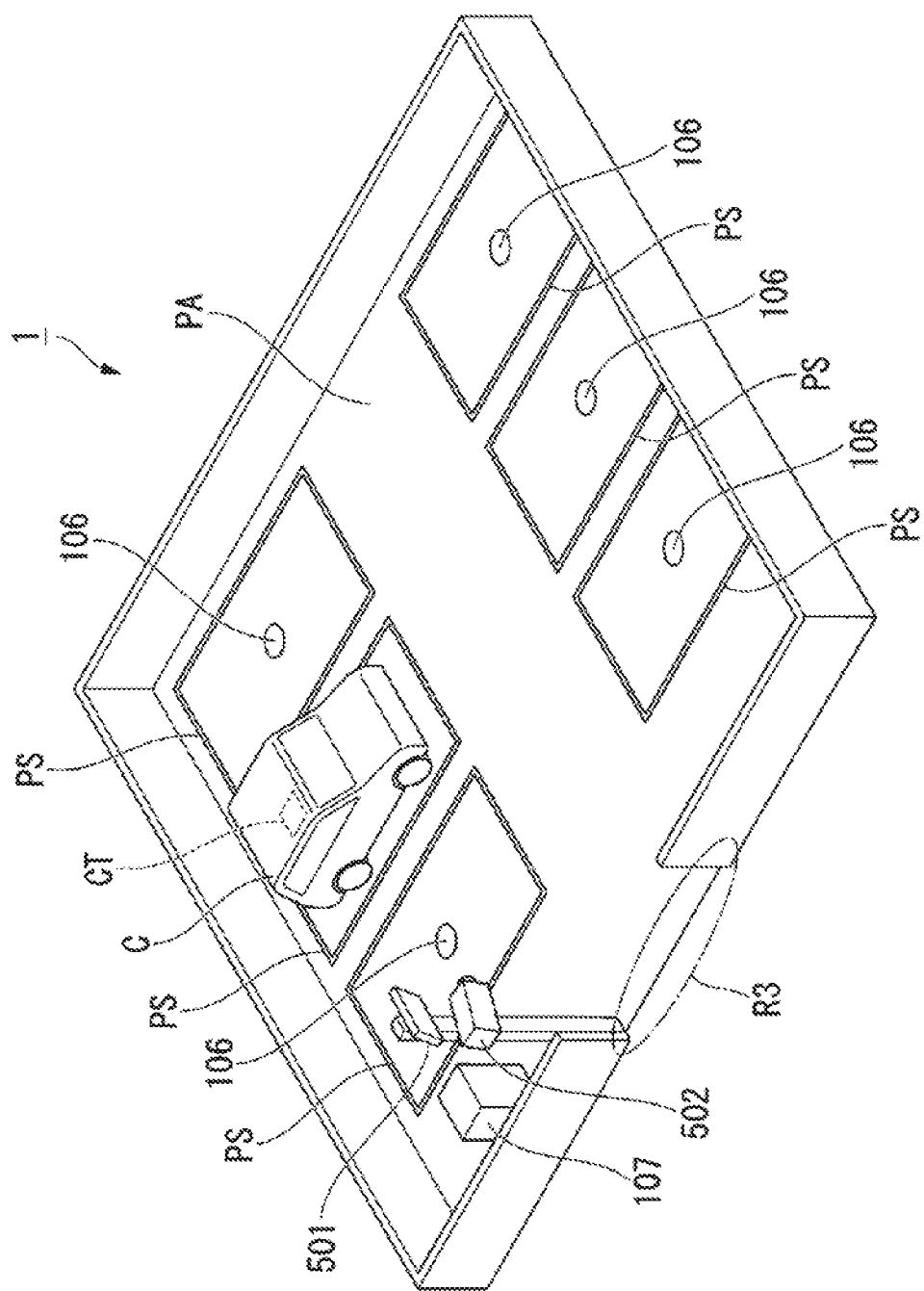
FIG. 5 is a view illustrating the entire configuration of a parking management system according to a second embodiment.

FIG. 5 is a view illustrating the entire configuration of the parking management system according to the second embodiment. In a parking area PA provided off a roadway, the parking management system 1 according to the second embodiment is a system for charging a vehicle C parked on a parking space PS in the parking area PA for a parking fee. In the present embodiment, the management area of the parking management system 1 is constituted by one parking area PA, and the management area corresponds to the parking area PA. Each parking space PS is divided by a division line. The parking management system 1 according to the second embodiment permits parking the vehicle C in which a Radio Frequency Identifier (RFID) tag CT for storing a user ID is provided. The RFID tag CT is a tag transferred or rent on the basis of a contract with a manager of the parking management system 1.

As illustrated in FIG. 5, the parking management system 1 includes an RFID antenna 501, a camera 502, a vehicle detection device 106, and a parking management device 107.

The RFID antenna 501 and the camera 502 are installed on a pole provided in the vicinity of the boundary of a gateway of the parking area PA. The vehicle detection device 106 is installed in the center of each of the parking spaces PS divided in the parking area PA.

The RFID antenna 501 performs wireless communications with the RFID tag CT provided in the vehicle C that makes entry into or exits from the parking area PA. That is, the RFID antenna 501 is installed in such a manner that the boundary on the gateway of the parking area PA is included in a communication range R3. Note that the RFID tag CT is a read-only device and cannot write information from the RFID antenna 501. The RFID antenna 501 reads a user ID from the RFID tag CT. The RFID antenna 501 is one example of a reading device for reading identification information that identifies the vehicle C from an identifying body (RFID tag CT) mounted on the vehicle C that enters the boundary of the management area. The camera 502 takes a photograph of the parking spaces PS in the parking area PA.

The vehicle detection device 106 detects the vehicle C that exists in the parking space PS in which the vehicle detection device 106 itself is provided.

The parking management device 107 acquires information from the RFID antenna 501 and the vehicle detection device 106 and performs charging processing for the vehicle C parked in the parking space PS.

In addition, the parking management device 107 determines whether an inappropriate vehicle C is parked in the parking space PS. The determination result is displayed on a communication terminal that the manager of the parking management system 1 carries. In addition, the parking management device 107 causes the communication terminal to display the images photographed by the camera 502 in response to the request of the manager.

Functional Configuration

Figure 6:
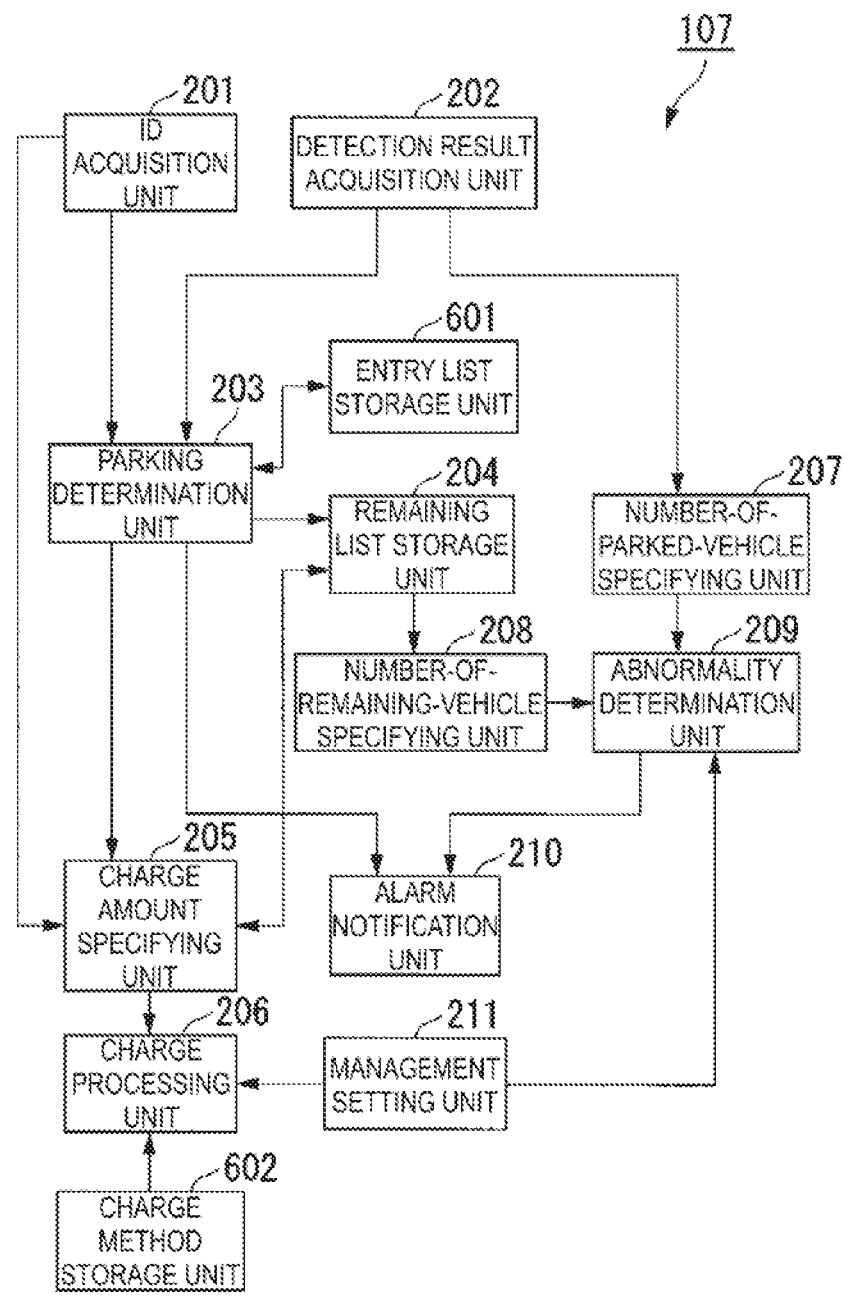
FIG. 6 is a schematic block diagram illustrating the functional configuration of a parking management device according to the second embodiment.

FIG. 6 is a schematic block diagram illustrating the functional configuration of the parking management device according to the second embodiment. The parking management device 107 according to the second embodiment further includes an entry list storage unit 601 and a charge method storage unit 602, in addition to the configuration of the first embodiment.

The entry list storage unit 601 stores the user ID of the vehicle C that enters the parking area PA and is not determined to be remaining.

The charge method storage unit 602 associates a user ID for identifying a user who signs a parking contract with a charging method for the user and stores the user ID and the charging method. The example of the charging method includes a credit card number (credit card payment), a bank account number (deduction from a bank account), and an address (delivery of a bill for bank transfer).

In addition, in the parking management device 107 according to the second embodiment, the operations of the ID acquisition unit 201, the parking determination unit 203, and the charge processing unit 206 are different from those of the first embodiment.

The ID acquisition unit 201 acquires a user ID read by communication with the RFID tag CT from the RFID antenna 501.

The parking determination unit 203 determines whether the vehicle C is parked in the parking space PS on the basis of the user ID acquired by the ID acquisition unit 201 and the detection result of the vehicle detection device 106 acquired by the detection result acquisition unit 202.

The charge processing unit 206 performs the charging processing of a parking fee specified by the charge amount specifying unit 205 in accordance with the charge method stored in the charge method storage unit 602.

Parking Determination Operation by Parking Management Device

Herein, the parking determination operation by the parking management device 107 will be described.

Figure 7:
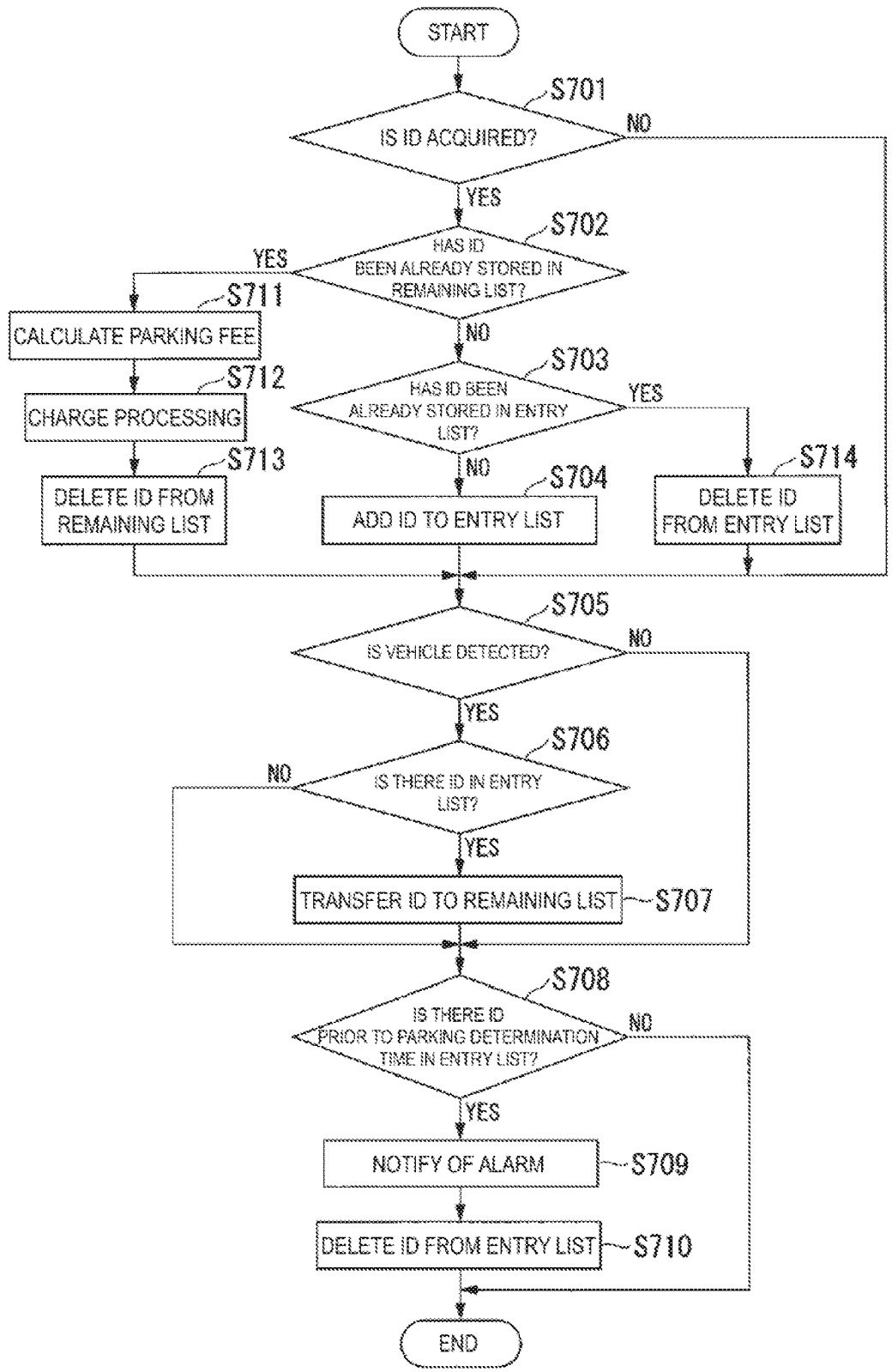
FIG. 7 is a flowchart illustrating a parking determination operation according to the second embodiment.

FIG. 7 is a flowchart illustrating the parking determination operation according to the second embodiment.

The parking management device 107 executes the parking determination operation illustrated in FIG. 7 in accordance with a preset execution cycle of the parking determination operation.

When the parking management device 107 starts the parking determination operation, the parking determination unit 203 determines whether the ID acquisition unit 201 acquires a user ID from the RFID antenna 501 (Step S701). When the ID acquisition unit 201 acquires the user ID (Step S701, YES), the parking determination unit 203 determines whether the user ID has been already stored in the remaining list storage unit 204 (Step S702). When the acquired user ID is not stored in the remaining list storage unit 204 (Step S702, NO), the parking determination unit 203 determines whether the user ID has been already stored in the entry list storage unit 601 (Step S703). That is, the parking determination unit 203 determines whether the acquired user ID is read for the first time or read again on the basis of the determination at Steps S702 and S703.

When the acquired user ID is not stored in any of the remaining list storage unit 204 and the entry list storage unit 601 (Step S703, NO), the parking determination unit 203 associates the user ID with a time point at which the user ID is read and stores the user ID and the time point in the entry list storage unit 601 (Step S704).

Subsequently, the parking determination unit 203 determines whether a new vehicle C is detected in the parking space PS on the basis of the detection result acquired by the detection result acquisition unit 202 (Step S705). When a new vehicle C is detected in the parking space PS (Step S705, YES), the parking determination unit 203 determines whether the user ID is stored in the entry list storage unit 601 (Step S706). As described above, the entry list storage unit 601 stores the user ID of the vehicle C that enters the parking area PA and is not remaining, so that when a new vehicle C is detected in the parking space PS in the case that the user ID is stored in the entry list storage unit 601, the parking determination unit 203 determines that the vehicle C including the user ID is parked in the parking space PS. When a new vehicle C is detected in the parking space PS, and the user ID is stored in the entry list storage unit 601 (Step S706, YES), the parking determination unit 203 transfers the user ID associated with the oldest read time point, out of the user IDs stored in the entry list storage unit 601, to the remaining list storage unit 204 (Step S707). Herein, "transferring the user ID" from the entry list storage unit 601 to the remaining list storage unit 204 means that the combination of the read time point and the user ID stored in the entry list storage unit 601 is deleted, and the combination is stored in the remaining list storage unit 204.

In contrast, when a new vehicle C is not detected in the parking space PS (Step S705, NO), when the user ID is not stored in the entry list storage unit 601 (Step S706, NO), or when the user ID is transferred to the remaining list storage unit 204, the parking determination unit 203 determines whether the user ID associated with a read time point before the passing determination time or more from the present time point exists in the entry list storage unit 601 (Step S708). When the user ID associated with a read time point before the passing determination time or more from the present time point exists in the entry list storage unit 601 (Step S708, YES), the alarm notification unit 210 notifies the manager of an alarm (Step S709). That is, the alarm notification unit 210 notifies an alarm in the case where the identical vehicle ID is not read again, and a new vehicle C is not detected in the parking space PS within the passing determination time from the time point at which the RFID antenna 501 reads the user ID for the first time. This is because the vehicle C remains in the parking area PA without being parked in the parking space PS. Subsequently, the parking determination unit 203 deletes the user ID from the entry list storage unit 601 (Step S710).

When the user ID associated with a read time point before the passing determination time or more from the present time point does not exist in the entry list storage unit 601 (Step S708, NO), or when the user ID is deleted from the entry list storage unit 601 at Step S710, the parking management device 107 finishes the parking determination operation.

In contrast, at Step S702, when the user ID acquired at Step S701 is stored in the remaining list storage unit 204 (Step S702, YES), the charge amount specifying unit 205 specifies a time from the read time point associated with the user ID and stored in the remaining list storage unit 204 to the read time point of the user ID acquired at Step S701. The charge amount specifying unit 205 calculates a parking fee on the basis of the specified time (Step S711). Subsequently, the charge processing unit 206 reads a charge method associated with the user ID from the charge method storage unit 602 and performs the charging processing of a parking fee calculated by the charge amount specifying unit 205 in accordance with the charge method (Step S712). Then, the charge amount specifying unit 205 deletes the vehicle ID acquired at Step S701 from the remaining list storage unit 204 (Step S713) and proceeds to the processing at Step S705.

In addition, at Step S703, when the user ID acquired at Step S701 is stored in the entry list storage unit 601 (Step S703, YES), the parking determination unit 203 deletes the user ID from the entry list storage unit 601 (Step S714) and proceeds to the processing at Step S705.

Abnormality Determination Operation by Parking Management Device

The abnormality determination operation according to the second embodiment is similar to that of the first embodiment.

Operational Effects

Thus, according to the present embodiment, when the passing determination time has not passed from a time point at which the user ID is read for the first time, the parking management system 1 stores the user ID in the entry list storage unit 601. At Step S710 described above, in the case where the passing determination time has passed from a time point at which the user ID is read for the first time while a new vehicle C is not detected in the parking space PS, the user ID is deleted from the entry list storage unit 601. Further, at Step S714 described above, in the case where the user ID is read again before the passing determination time passes from a time point at which the user ID is read for the first time, the user ID is deleted from the entry list storage unit 601. Then, at Step S707 described above, in the case where a new vehicle C is detected in the parking space PS during the passing determination time passes from a time point at which the user ID is read for the first time, the user ID is transferred from the entry list storage unit 601 to the remaining list storage unit 204.

Consequently, it can be determined whether the vehicle C that enters the parking area PA is parked in an appropriate parking space PS even when the travel direction of vehicle C on the boundary of the parking area PA is not one way.

Modified Example

Note that the parking area PA according to the present embodiment is provided off a roadway and includes only one gateway, but not limited to this. For example, the parking area PA according to the other embodiments may include a division having a branch in the roadway, that is, three boundaries or more may be provided in the parking area PA. In this case, it can be determined whether the vehicle C that enters the parking area PA is parked in an appropriate parking space PS by the parking determination operation according to the present embodiment by providing an antenna including a communication range on each boundary. In addition, the parking area PA according to the other embodiments may be provided on one division of the two-way, two-lane roadway.

In addition, the parking management system 1 according to the present embodiment includes the RFID antenna 501, but is not limited to this. For example, the parking management system 1 according to the other embodiments may include an antenna for DSRC communication or Bluetooth (registered trademark) Low Energy (BLE) in place of the RFID antenna 501. That is, the communication method between the parking management system 1 and the vehicle C is not limited to the RFID.

Third Embodiment

Figure 8:
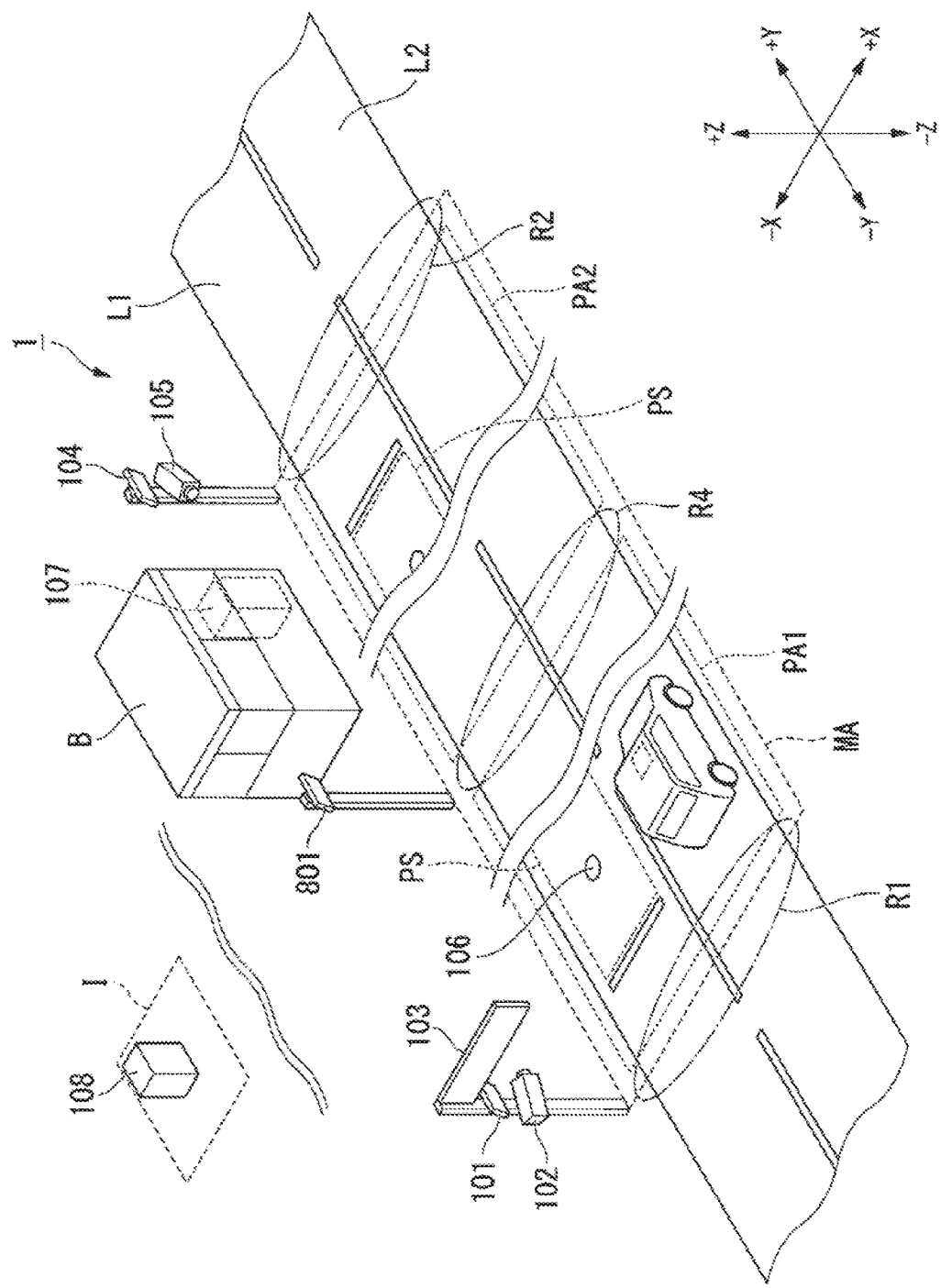
FIG. 8 is a view illustrating the entire configuration of a parking management system according to a third embodiment.

Hereinafter, the parking management system according to a third embodiment will be described in detail with reference to drawings. FIG. 8 is a view illustrating the entire configuration of the parking management system according to the third embodiment. In the first and second embodiments, the management area of the parking management system 1 is constituted by one parking area PA, and the management area corresponds to the parking area PA. In contrast, as illustrated in FIG. 8, in the third embodiment, a management area MA of the parking management system 1 is constituted by two parking areas PA. Specifically, the management area MA is constituted by a first parking area PA1 that is an upstream-side parking area and a second parking area PA2 that is a downstream-side parking area.

Entire Configuration

The parking management system 1 according to the third embodiment further includes a third antenna 801, in addition to the configuration of the first embodiment.

The third antenna 801 is installed on a pole provided in the vicinity of the boundary between the first parking area PA1 and the second parking area PA2. The third antenna 801 performs wireless communications with the onboard unit CE mounted on the vehicle C moving from the first parking area PA1 to the second parking area PA2. That is, the third antenna 801 is installed in such a manner that the boundary between the first parking area PA1 and the second parking area PA2 is included in a communication range R4. The third antenna 801 is one example of a secondary reading device for reading identification information from the identifying body (onboard unit CE) mounted on the vehicle C that enters the boundary of the parking area PA.

Note that the boundary on the upstream side of the management area MA, that is, the boundary on the upstream side of the first parking area PA1 is included in the communication range R1 of the first antenna 101. In addition, the boundary on the downstream side of the management area MA, that is, the boundary on the downstream side of the first parking area PA2 is included in the communication range R2 of the second antenna 104.

Functional Configuration

Figure 9:
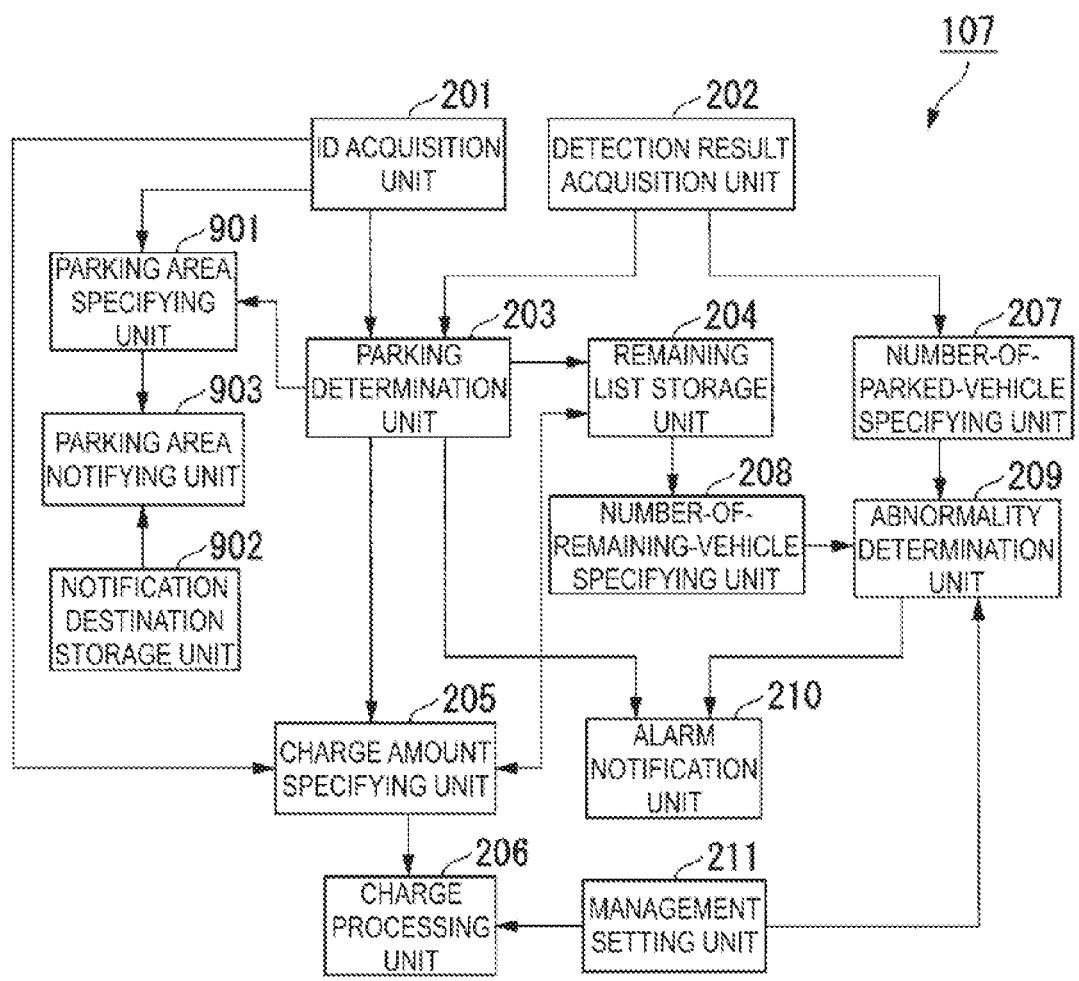
FIG. 9 is a schematic block diagram illustrating the functional configuration of a parking management device according to the third embodiment.

FIG. 9 is a schematic block diagram illustrating the functional configuration of the parking management device according to the third embodiment. The parking management device 107 according to the third embodiment further includes a parking area specifying unit 901, a notification destination storage unit 902, and a parking area notifying unit 903, in addition to the configuration of the first embodiment.

The parking area specifying unit 901 specifies a parking area PA including a parking space PS in which the vehicle C is parked on the basis of whether the vehicle ID of the vehicle C determined to be parked by the parking determination unit 203 is read by the third antenna 801.

The notification destination storage unit 902 associates the vehicle ID with a contact address (e.g., e-mail address) of a driver of the vehicle C indicated by the vehicle ID and stores the vehicle ID and the contact address.

The parking area notifying unit 903 notifies the identification information of the parking area PA specified by the parking area specifying unit 901 to the contact address stored in the notification destination storage unit 902.

Area Notification Operation by Parking Management Device

The parking determination operation and the abnormality determination operation according to the third embodiment are similar to those of the first embodiment. In contrast, the parking management device 107 according to the third embodiment executes an area notification operation described below when the vehicle ID is stored in the remaining list storage unit 204 at Step S306 in the parking determination operation according to the first embodiment.

Figure 10:
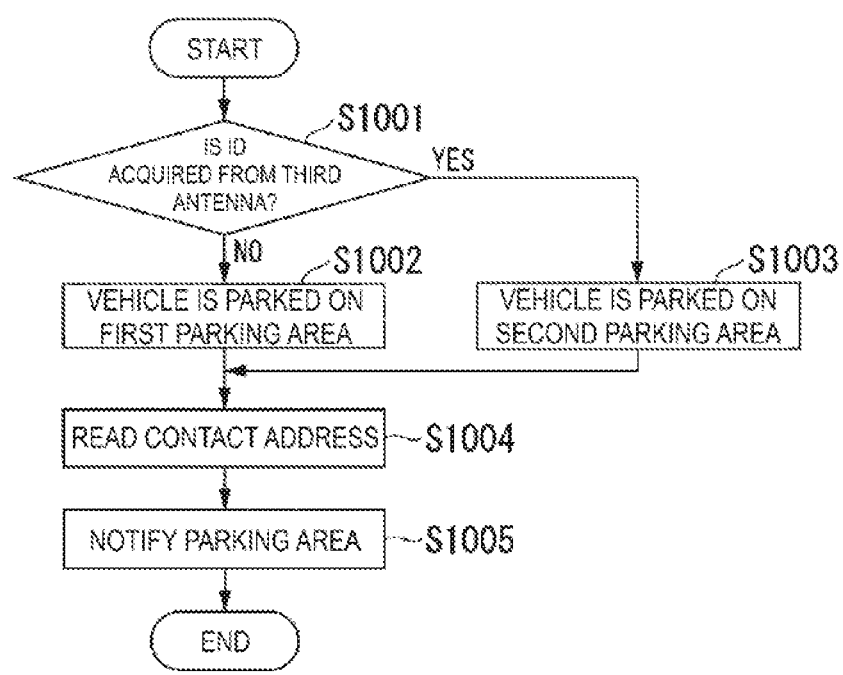
FIG. 10 is a flowchart illustrating an area notification operation according to the third embodiment.

FIG. 10 is a flowchart illustrating the area notification operation according to the third embodiment.

When the parking management device 107 starts the area notification operation, the parking area specifying unit 901 determines whether the ID acquisition unit 201 acquires a vehicle ID of the vehicle C determined to be parked by the parking determination unit 203 from the third antenna 801 prior to Step S306 (Step S1001). That is, the parking area specifying unit 901 determines whether the identical vehicle ID is read again by the third antenna 801 during the passing determination time from a time point when the first antenna 101 has read the vehicle ID.

When the ID acquisition unit 201 does not acquire the vehicle ID from the third antenna 801 (Step S1001, NO), the parking area specifying unit 901 determines that the vehicle C is parked in the first parking area PA1 (Step S1002). In contrast, when the ID acquisition unit 201 acquires the vehicle ID from the third antenna 801 (Step S1001, YES), the parking area specifying unit 901 determines that the vehicle C is parked in the second parking area PA2 (Step S1003).

When the parking area specifying unit 901 specifies the parking area PA at Step S1002 or Step S1003, the parking area notifying unit 903 reads the contact address associated with the vehicle ID from the notification destination storage unit 902 (Step S1004). The parking area notifying unit 903 notifies the identification information of the parking area PA specified by the parking area specifying unit 901 to the read contact address (Step S1005).

Operational Effects

Thus, according to the present embodiment, the parking management system 1 specifies the parking area PA in which the vehicle C is parked on the basis of the read result of the vehicle ID by the third antenna 801 provided on the boundary of the plurality of parking areas. Consequently, the user of the parking management system 1 can recognize on which parking area PA his/her own vehicle C is parked by receiving the notification of the parking area PA specified by the parking management system 1.

Note that when an e-mail address of the communication terminal of a user is designated as a contact address, the business operator and service franchisees of a parking system may provide a parking lot complimentary service such as a discount in response to the presentation of the notification of the identification information of the parking area PA received by the communication terminal.

Modified Example

Note that the management area MA according to the present embodiment is constituted by two parking areas PA, but not limited to this. For example, the management area MA according to the other embodiments may be constituted by three or more parking areas PA. In this case, the secondary reading device corresponding to the third antenna 801 is provided on the boundary of each parking area PA. In addition, when there are three or more parking areas PA, the parking area specifying unit 901 can specify the parking area PA on the basis of the number of times of the reading of the secondary reading device, not the presence or absence of the reading. For example, when the secondary reading device reads the same vehicle ID twice, the parking area specifying unit 901 determines that the vehicle C indicated by the vehicle ID is parked in the third parking area from the upstream.

In addition, the parking area specifying unit 901 according to the other embodiments may specify the parking area PA on the basis of the identification information of the secondary reading device that has read the identical vehicle ID at the very end, not the number of times of the reading of the secondary reading device.

Other Embodiments

Hereinbefore, one embodiment has been described in detail with reference to the drawings, but specific configuration is not limited to the description above, and various modifications and changes can be applied.

For example, in the other embodiments, a non-contact charger for electric vehicle (EV) may be buried in the parking spaces PS. Thus, in the case where the vehicle C is an EV, a battery can be charged while the vehicle C is parked in the parking space PS. When the parking space PS functions as the traffic roadway, the non-contact charger may be charged during travel.

In addition, in the other embodiments, the parking management system 1 may be synchronized with Electronic Toll Collection System (ETC) (registered trademark) (also referred to as "electronic toll collection system", "automatic toll collection system"), Electronic Road Pricing (ERP), or other charge systems for a toll road. For example, it may be such that the parking management system 1 notifies the parking time of the vehicle C to other charge systems, and a discount corresponding to the parking time is made in other charge systems. In addition, in other charge systems, part of the parking fee charged by the parking management system 1 may be utilized for a parking fee for a toll road. This is because the parking of the vehicle in the parking area PA can be regarded as contribution to the alleviation of traffic congestion.

In addition, in the embodiments described above, the parking management system 1 includes antennas (the first antenna 101, the second antenna 104, the third antenna 801, and the RFID antenna 501) and acquires the identification information from the onboard unit CE or the RFID tag CT, but is not limited to this. For example, in the other embodiments, a number plate recognition device may be provided in place of the antennas. In this case, the charge processing unit 206 performs charging processing in accordance with a charge method associated in advance with the number of a number plate. That is, the number of a number plate is one example of the identification information.

In addition, in the other embodiments, the parking management system 1 may cooperate with the vehicle C having a function of parking a vehicle C in a garage according to automatic operation. Specifically, the parking management system 1 transmits the empty status of the parking space PS and information on the inside of a parking lot to the vehicle C via the first antenna 101. After conducting communications with the first antenna 101, the vehicle C is parked in the parking space according to the automatic operation on the basis of the received information. Consequently, the parking management system 1 can achieve a crewless valet parking function.

Computer Configuration

Figure 11:
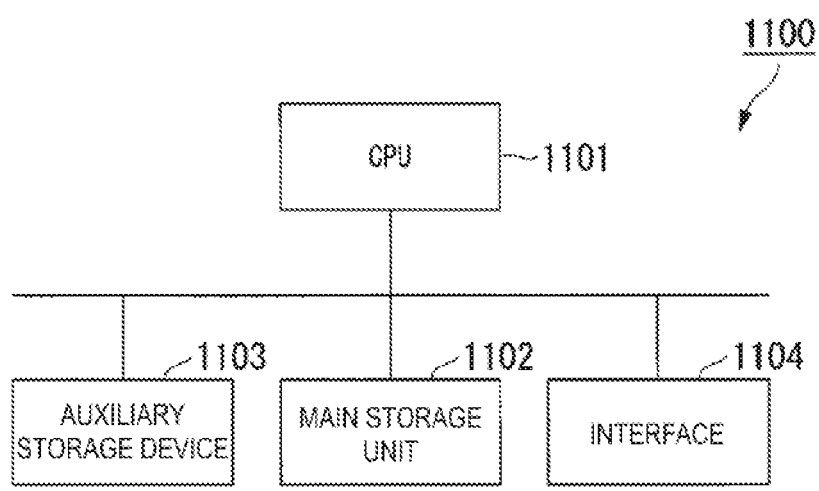
FIG. 11 is a schematic block diagram illustrating a configuration of a computer according to at least one embodiment.

FIG. 11 is a schematic block diagram illustrating the configuration of a computer according to at least one embodiment.

A computer 1100 includes a CPU 1101, a main storage device 1102, an auxiliary storage device 1103, and an interface 1104.

The parking management device 107 described above is mounted on the computer 1100. Then, the operation of each processing unit described above is stored in the auxiliary storage device 1103 in the form of a program. The CPU 1101 reads the program from the auxiliary storage device 1103, develops the program in the main storage device 1102, and executes the processing in accordance with the program. In addition, the CPU 1101 secures a storage area in the main storage device 1102 corresponding to each storage unit described above in accordance with the program.

Note that at least in one embodiment, the auxiliary storage device 1103 is one example of a tangible medium that is not temporary. Other examples of a tangible medium that is not temporary include a magnetic disk, a magneto-optical disk, a Compact Disc Read Only Memory (CD-ROM), a Digital Versatile Disc Read Only Memory (DVD-ROM), and a semiconductor memory, each of which is connected via the interface 1104. In addition, when this program is delivered to the computer 1100 via a communication circuit, the computer 1100 that receives the delivery may develop the program in the main storage device 1102 and execute the program.

Similarly, the program may serve to achieve some of the functions described above. Further, the aforementioned functions may be achieved by the combination of this program and another program having already stored in the auxiliary storage device 1103, and namely, this program may be so-called a differential file (differential program).

INDUSTRIAL APPLICABILITY

According to the parking management system of the aforementioned embodiments, parking management can be made with simple structure.

REFERENCE SIGNS LIST

1 Parking Management System
101 First Antenna
104 Second Antenna
106 Vehicle Detection Device
107 Parking Management Device
201 ID Acquisition Unit
202 Detection Result Acquisition Unit
203 Parking Determination Unit
204 Remaining List Storage Unit
205 Charge Amount Specifying Unit
206 Charge Processing Unit
207 Number-of-Parked-Vehicle Specifying Unit
208 Number-of-Remaining-Vehicle Specifying Unit
209 Abnormality Determination Unit
210 Alarm Notification Unit
211 Management Setting Unit

The invention claimed is:

1. A parking management system comprising:
a reading device configured to read identification information for identifying a vehicle from an identifying body mounted on the vehicle that passes a boundary of a management area including parking spaces in each of which one vehicle can be parked;
a vehicle detection device configured to detect a vehicle positioned on each of the parking spaces; and
a parking management device configured to acquire the identification information from the reading device and acquire a detection result of the vehicle positioned on each of the parking spaces from the vehicle detection device,
wherein the parking management device comprises a computer with a CPU and a storage device, and
the storage device stores a program for causing the computer to function as: a parking determination unit configured to determine that a vehicle indicated by the identification information is parked in one parking space of the parking spaces when the identical identification information is not read again during a predetermined passing determination time and when a new vehicle is detected in the parking space by the vehicle detection device during the passing determination time, and
wherein measurement of the passing determination time is started from a time point at which the identification information is initially read by the reading device.

2. The parking management system according to claim 1, wherein the program causes the computer to function as:
a charge amount specifying unit configured to specify a parking fee of the vehicle determined to be parked in the parking spaces by the parking determination unit on a basis of a time from a time point at which the identification information is initially read by the reading device to a time point at which the identification information is read again.

3. The parking management system according to claim 1, wherein the management area is constituted by a plurality of parking areas including the parking spaces in each of which one vehicle can be parked, and
the parking management system further includes a secondary reading device configured to read the identification information from the identifying body mounted on a vehicle that enters the boundary of the parking area, and
the program causes the computer to function as:
a parking area specifying unit configured to specify, on a basis of a reading result of the identification information of a vehicle determined to be parked by the parking determination unit, the parking area including a parking space in which the vehicle determined to be parked by the parking determination unit is parked.

4. The parking management system according to claim 1, wherein the storage device further stores a program for causing the computer to function as:
a number-of-remaining-vehicle specifying unit configured to specify the number of pieces of identification information that is not read again during the passing determination time from a time point the identification information is initially read by the reading device;
a number-of-parked-vehicle specifying unit configured to specify the number of parking spaces where a vehicle is detected by the vehicle detection device; and
an abnormality determination unit configured to determine that an abnormality occurs when the number of pieces of identification information specified by the number-of-remaining-vehicle specifying unit has not continuously correspond to the number of parking spaces specified by the number-of-parked-vehicle specifying unit during a predetermined abnormality determination time or more.

5. The parking management system according to claim 1, wherein the management area includes a plurality of boundaries,
the at least one reading device includes a plurality of reading devices, each being provided on each of the boundaries of the management area, and
when the identical identification information is not read by another reading device during the passing determination time from a time point at which the identical identification information is initially read by one reading device, and when a new vehicle is detected in one of the parking spaces by the vehicle detection device during the passing determination time, the parking determination unit determines that a vehicle indicated by the identification information is parked in one of the parking spaces.

6. The parking management system according to claim 1, wherein the management area is one division of a roadway,
the parking space is part of the division, and
the reading device is provided on the boundary on an upstream side of the division and on the boundary on a downstream side of the division.

* * * * *